United States Patent [19]

Hagen

[11] 4,150,080

[45] Apr. 17, 1979

[54] METHOD FOR SEPARATION OF WASTE MATERIAL FROM A MOULDED ARTICLE

[75] Inventor: Reinold Hagen, Bonn-Holzlar, Fed. Rep. of Germany

[73] Assignee: Kautex-Werke Reinold Hagen GmbH, Bonn-Holzlar, Fed. Rep. of Germany

[21] Appl. No.: 745,720

[22] Filed: Nov. 29, 1976

Related U.S. Application Data

[63] Continuation of Ser. No. 535,676, Dec. 23, 1974, abandoned.

[30] Foreign Application Priority Data

Dec. 24, 1973 [DE] Fed. Rep. of Germany ....... 2364510

[51] Int. Cl.$^2$ .................... B29C 17/07; B29C 17/10
[52] U.S. Cl. .................... 264/523; 264/40.5; 264/536; 264/151; 264/161; 264/163; 425/150; 425/527; 425/531
[58] Field of Search ............ 264/40, 151, 161, 163, 264/94, 96, 98, 99, 89, 248, 40.1, 40.5; 425/150, 297, 302 B, 305 B, 503, 519, 326 B, 387 B, DIG. 212, DIG. 231, 806 A, 527, 531

[56] References Cited

U.S. PATENT DOCUMENTS

| | | | |
|---|---|---|---|
| 1,514,183 | 11/1924 | Steele et al. | 264/161 X |
| 3,217,357 | 11/1965 | Martin, Jr. | 264/98 X |
| 3,422,174 | 1/1969 | Hagen | 264/98 X |
| 3,484,897 | 12/1969 | Kovacs | 264/98 X |

*Primary Examiner*—Jan H. Silbaugh
*Attorney, Agent, or Firm*—Edwin E. Greigg

[57] ABSTRACT

A method of and apparatus for separating off waste material from a moulded article in the production of hollow articles of thermoplastics material by a blowing process in a multi-part mould involves pinching together regions of a partly-made article during closure of the mould parts around it and once a satisfactory weld seam has been created at the pinch regions then increasing the closure speed of the mould parts. Control of the mould closure speed may be effected by open loop control or by automatic control, and may be made dependent on time and/or on displacement of the mould parts. The increased final closure speed can with advantage be equal to the mould closure speed at which the mould parts are moved up to the beginning of the pinching process.

4 Claims, 9 Drawing Figures

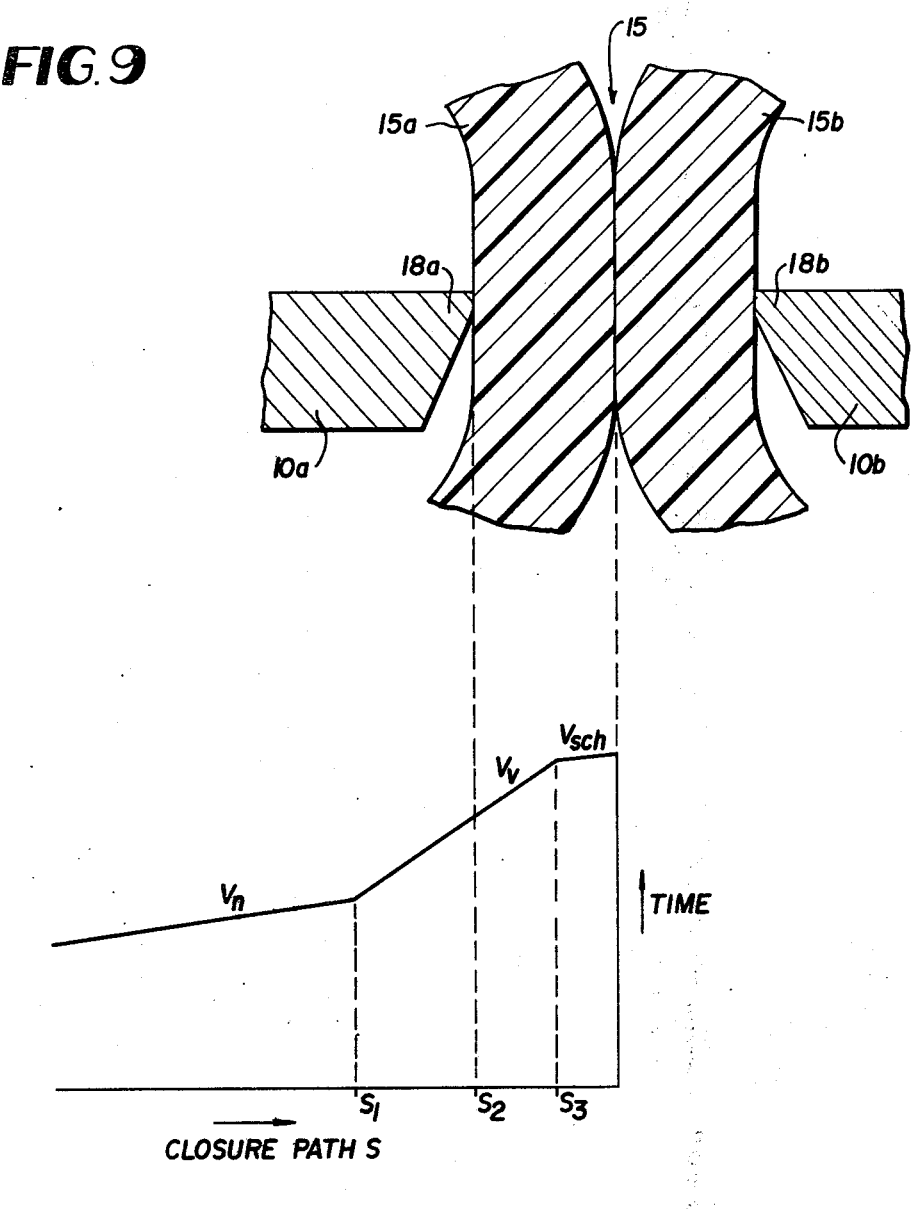

METHOD FOR SEPARATION OF WASTE MATERIAL FROM A MOULDED ARTICLE

This is a Continuation of application Ser. No. 535,676, filed Dec. 23, 1974, now abandoned.

FIELD OF THE INVENTION

This invention relates to a method of and apparatus for separating off waste material from a moulded article in the production of hollow articles of thermoplastics material by a blowing process, in which a plastic, tubular or sheet-form partly-made article is enclosed in a hollow multi-part mould provided with pinch edges, and upon closure of the hollow mould parts regions of the partly-made article are held fast and pinched together by the pinch edges with the consequent formation of waste material to be separated away, and in which also at the pinch zones regions of the partly-made article are welded to one another.

DESCRIPTION OF THE PRIOR ART

In many cases the hollow articles produced by a blowing process involving the use of hollow moulds provided with pinch edges can be broken away without difficulty from the waste material by a subsequent finishing operation. This can be effected by hand or alternatively by appropriate machining devices. The use of cutting or stamping processes or the like is thus in general not necessary. However, to an increasing degree materials are being used whose properties make it either difficult or quite impossible in many cases to effect a simple breakaway of the waste material if no special precautions are taken. In this connection it is of significance that hollow articles are increasingly having to be made whose shape is extremely complex. This is the case in particular both for hollow tanks and also for industrially used hollow articles. In all cases the fact of primary significance is that during the course of the pinching operation two objectives have to be borne in mind. Firstly, there should be as far as possible complete separation away of the superfluous material, and secondly there should be the production of a satisfactory weld join between the parts. In relation to the measures necessary for the production of hollow articles these two considerations have heretofore not been reconciled or have been reconciled only with difficulty. In actual practice these two requirements and the effects stemming from them tend to be mutually exclusive. A complete separation away of the waste material requires in general a comparatively rapid closure of the hollow mould and thus of the pinch edges, whereas on the other hand the production of a satisfactory weld seam requires a slower closure of the mould and of the pinch edges.

As a consequence it has been the practice to choose the closure speed of the mould for any particular case in the light of the necessary and desired quality of the weld seam, with the result that in general a relatively slow closure speed has been considered to be unavoidable right up to the termination of the closure process. It has also been accepted that an improvement in the pinching process can be achieved by an appropriate choice of the magnitude of the closure force. However, the application of the requirements resulting from these concepts has led to apparatus of particularly large size, particularly in relation to the drive means, and this leads to the whole apparatus becoming uneconomical. Consequently, a method has already been developed for the separation away of waste material in the manufacture of hollow articles of thermoplastics material in which the separation takes place after the closure of the hollow mould by using one or more hammers. However, this means that it is necessary to provide the hollow mould with a hammer device. Moreover, this method can only be used with considerable difficulty in the case of large scale hollow moulds used for the production of correspondingly large hollow articles since the hammer device and its mass must be suitably greater than the mass of the hollow mould. In addition, the impacts can only be effected on the hollow mould after the mould parts have finished their closure movement. The material which is located between the pinch edges of the mould parts and which is compressed to a thin film has until this point in time, at which the hammering takes place, already undergone a considerable cooling which of course leads to a rigidification of the material. This additionally complicates the pinching process.

SUMMARY OF THE INVENTION

It is an object of the present invention to provide a method of the type first mentioned above in which on the one hand a weld seam is produced which is satisfactory and sufficient for all demands made upon it, and in which on the other hand the thickness of the residual film remaining at the end of the closure movement of the mould parts and which connects the waste material to the hollow article is so reduced that the waste material is only loosely connected to the hollow article and consequently can be easily removed or indeed completely separated away. An increase in the closure force of the mould parts should not be necessary.

In accordance with the present invention there is provided a method of separating off waste material from a moulded article in the production of hollow articles of thermoplastics material by a blowing process, which comprises enclosing a plastic, tubular or sheet-form partly-made article in a hollow multi-part mould provided with pinch edges, and effecting closure of the hollow mould parts so that regions of the partly-made article are pinched together by the pinch edges with the consequent formation of waste material to be separated away and so that at the pinch zones regions of the partly-made article are welded to one another, characterised in that during a first phase of the pinching process the hollow mould parts and the pinch edges are moved together at a speed favourable for the formation of a weld seam, and in a second phase of the pinching process the rate of closure of the mould parts is increased.

Also in accordance with the present invention there is provided apparatus for producing hollow articles of thermoplastics material by a blowing process, which comprises a hollow mould having at least two relatively movable co-operable parts provided with pinch edges, means to locate a plastic, tubular or sheet-form partly-made article at a position between the pinch edges, drive means to effect a closing movement of the mould parts so that regions of the partly-made article are pinched together and welded to each other at the pinch zones, and control means operative to control the supply of an energy source to said drive means, said control means being arranged to increase the supply of energy to said drive means during the final phase of the pinching process.

Preferably, the closure speed is increased during the second half of the period that the pinching process is effected. In each case the acceleration of the closure movement preferably first takes place only after the regions of the partly-made article which are to be welded together have been brought into contact with one another under pressure and sufficient time for the formation of a good weld connection has been allowed. The subsequent phase of movement with increased speed brings about the actual separating process, this taking place after the process which is essential for the formation of a satisfactory weld seam. It has been proved to be particularly advantageous if the closure speed in the second phase of the pinching process is substantially equal to the closure speed with which the mould parts are moved approximately up to the beginning of the pinching process. This presupposes that normally the mould parts, up until shortly before the beginning of the pinching process, are moved at comparatively high speed in the sense to close the mould in order to reduce as far as possible the overall time necessary to carry out the closure process.

The results achievable by means of the present invention are dependent within certain limits upon the properties of the material used. It is thus possible that with a material which is easily worked a trouble free weld seam can be produced and in addition the waste material can be completely separated off. With other materials however which are more difficult to work, a trouble-free weld seam can be achieved and the waste material must be separated specially. In each case however there is an essential improvement over the prior methods in which no special precautions have been taken in relation to the production of the weld seam and the separation of the waste material. This is essentially due to the fact that in accordance with the method of the present invention the kinetic energy is increased and/or the pinching process is terminated before the plastics material which is located immediately in front of the pinch edges has undergone any great degree of cooling and has thus become rigidified.

The open loop control or automatic control of the closure speed of the mould parts can be effected in dependence upon time and/or displacement and/or the pinching pressure which is exerted in the region of the pinch edges.

With the apparatus of the present invention, normally the control means reduces the energy supply to the drive means immediately before the beginning of the pinching process, since up to that point the closure movement as already mentioned, is effected at relatively high speed. The simplest type of such open loop control can be achieved by a control element which changes the energy flow and thus the speed substantially in the form of a step i.e., without a gradual transition between the speed ranges.

The control means may comprise a time-control unit. With the use of a hydraulic drive means for the mould parts the control means is then arranged continuously to change the volume of hydraulic fluid supplied to the drive means according to a predetermined function.

It is also possible that the control means may comprise open loop control means actuated directly or indirectly by an actuating means, such as a cam, and wherein the actuating means and/or the control means are carried by at least one of the mould parts or by a component connected thereto which participates in the closure movement. It is alternatively possible that the actuating means can be carried by a mould part or by an associated part and the control means carried by another mould part or by a component associated therewith. In each case a stepless or gradual speed cycle can be achieved.

According to an alternative preferred embodiment of the invention the control means comprises a regulator which is arranged to compare the actual and desired values of the speed of movement of the mould parts and generate an error signal in response to departures of the actual value from the desired value, and a control element connected into the energy supply path to the drive means and controlled by the regulator. Actual values and desired values of speed can be provided or generated in dependence upon the displacement of the mould parts. The signals representative of the desired values can be provided by an appropriate programmer which for example may be formed as a cam. It is possible that the means providing the actual values may be carried by at least one of the mould parts or by components associated therewith.

The various open loop control and automatic control arrangements referred to above are not limited only to hydraulic or pneumatic drive systems for the mould parts. On the contrary, it is equally possible and advantageous to use an analogous arrangement with other, for example electrical, drive means.

BRIEF DESCRIPTION OF THE DRAWINGS

A number of embodiments in accordance with the invention will now be described by way of example and with reference to the accompanying drawings, in which:

FIG. 9 is a schematic diagram of the cooperation of two mold parts and the associated path-time diagram.

DESCRIPTION OF THE PREFERRED EMBODIMENTS

Figure 1:
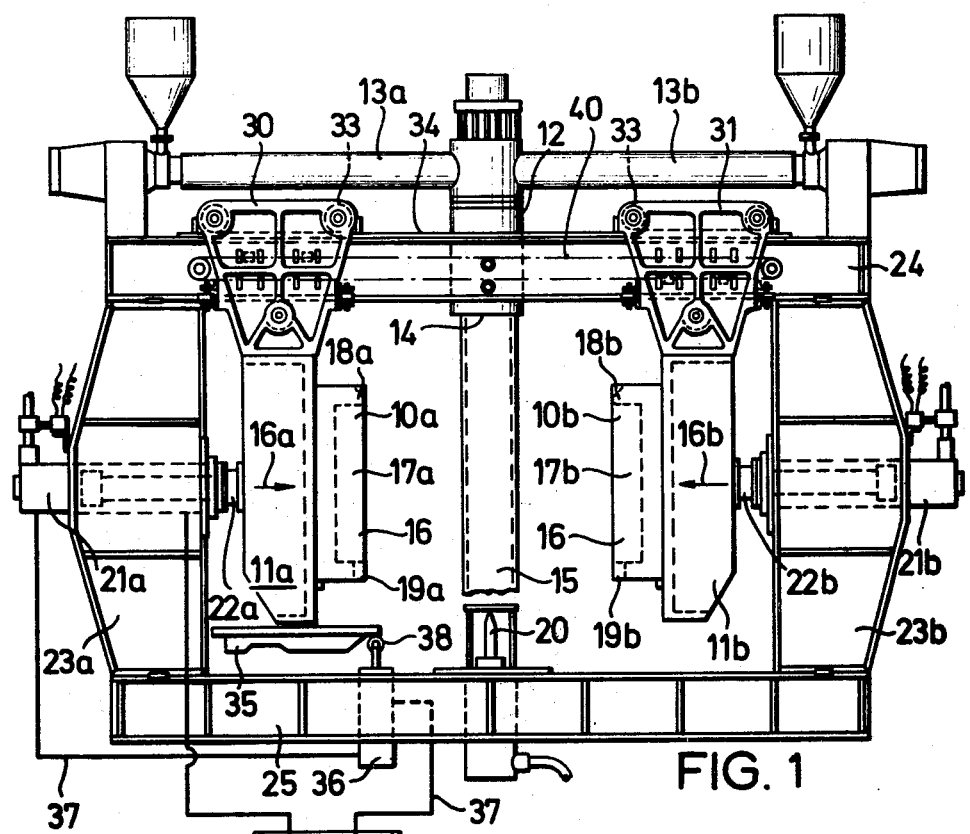
FIG. 1 is a side view of apparatus for the manufacture of hollow articles of thermoplastics material by a blowing process with programmed open loop control for the closure movement of the mould parts.

The embodiment of apparatus shown in FIG. 1 of the drawings comprises a two-part hollow mould which has two mould halves 10a and 10b. The two mould halves are detachably mounted on respective support members 11a and 11b. Above the hollow mould 10a, 10b is positioned an injection head 12 to which the thermoplastics material is supplied through two extruders 13a and 13b. The injection head 12 is provided at its underside 14 with an annular nozzle so that a tubular partly-finished product 15 is squeezed out from the nozzle.

When the partly-finished product 15 has reached the length necessary for the production of the desired hollow article the hollow mould is closed by movement of the two mould halves 10a and 10b in the direction of the arrows 16a and 16b respectively. Each mould half has a recess 17a, 17b therein. In the closed state of the hollow mould the two recesses jointly form a mould pocket whose shape corresponds to the external configuration of the hollow article which is to be produced. Each mould half 10a, 10b is provided with pinch edges 18a, 18b and 19a, 19b.

The enlargement of the partly-finished product 15 within the closed hollow mould is effected by a pressurised medium which is fed to the mould through a blowing nozzle 20 which in the embodiment shown in FIG. 1 projects up from below into the hollow mould and into the preform blank located therein. It is of course alternatively possible to arrange the blowing nozzle 20 in some other manner, for example so that it projects into the hollow mould from above. The blowing nozzle 20 is arranged to be movable back and forth towards and away from the mould.

The reciprocal movement of the two mould halves 10a, 10b for the purpose of closing and opening the hollow mould is carried out by hydraulic cylinders 21a, 21b. Pistons guided in the cylinders 21a, 21b have piston rods 22a, 22b extending therefrom and these piston rods are connected respectively with the support members 11a, 11b. The cylinders 21a, 21b are carried on upright columns 23a, 23b of a rectangular frame which is completed by two crossbeams 24 and 25. Each of the support members 11a, 11b is provided at the upper side thereof with extension portions 30, 31 to which rollers 33 are fitted. These rollers 33 run on the upper surface 34 of the upper crossbeam 24.

Figure 3:
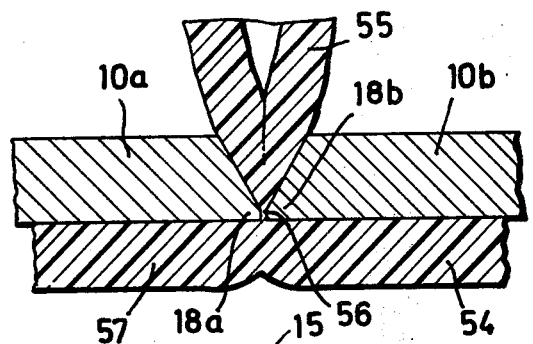
FIG. 3 is a sectional view, on an enlarged scale, through a hollow mould in the closed position of the mould parts.
Figure 4:
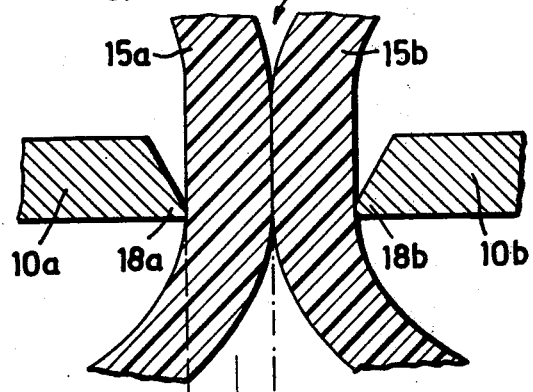
FIG. 4 is a view corresponding to FIG. 3 but prior to the completion of the closure movement of the mould parts; and, FIGS. 5 to 8 are displacement-time diagrams of the mould closure process, with certain points on these diagrams being linked to the illustration shown in FIG. 4.

During the closure movement of the two mould halves 10a, 10b in the direction of the arrows 16a, 16b the pinch edges 18a, 18b and 19a, 19b come into engagement with the outer surface of the partly-finished product 15. As the closure movement continues so the tubular partly-finished product 15 is pressed flat in the region of the pinch edges so that in the region of for example the upper pinch edges 18a and 18b two parallel wall parts 15a, 15b are formed initially which lie opposite to one another and which come into engagement with one another shortly before the termination of the closure movement. This state is shown in FIG. 4 of the drawings. Starting from this point, in the embodiment shown in FIG. 1, a container or hollow article is produced which rests in the hollow mould on its head, and in the region of the pinch edges 18a, 18b the base 54 (FIG. 3) of the container is formed and is provided there with a welded seam. The latter is produced by virtue of the fact that the two opposing wall portions 15a, 15b of the partly-finished product are joined fixedly with one another by a welding process. Simultaneously, the material of the partly-finished product 15 which is above the pinch edges 18a, 18b is separated away so that the resulting waste piece 55 is located between the injection head 12 and the hollow mould 10a, 10b.

Although not so shown in FIG. 1, the closing movement of the two mould halves may begin before the intermediate or partly-finished product 15 has reached its maximum length. The only decisive requirement is that the necessary length of the partly-finished product should be achieved by the time that the mould halves 10a, 10b and the pinch edges 18a, 18b; 19a, 19b first contact the partly-finished product 15 in the course of the closure movement.

In the apparatus shown in FIG. 1 one of the support members 11a is provided with a cam surface 35 which, in dependence upon the position, i.e., the movement, of one or both of the mould parts 10a, 10b actuates a controller element 36 (volumetric flow valve) which is connected into the energy flow path 37 of the drive system, here shown formed as the cylinders 21a, 21b. This valve 36 is provided with a movable part 38 which is actuated by the cam 35 (programmer) in the course of the closure movement of the hollow mould parts. The shape of the cam 35 is so chosen that in the energy flow path 37 through the pump 45 a volumetric flow to the cylinders is achieved which corresponds to the desired closure rate. In FIG. 1 of the drawings only one of the support members 11a is shown as being provided with such a cam 35. In general, this is quite sufficient since both drive cylinders 21a and 21b can be controlled from just one valve 36, especially in view of the fact that the two mould parts 10a, 10b are automatically synchronised by means of chains 40 or the like which are connected to the two extension pieces 30 and 31.

In FIGS. 5 to 8 the closure movements are shown in terms of displacement-time diagrams. The different speeds of closure of the mould parts are represented by the slope of the curves. The flatter the slope, the greater is the speed; the steeper the slope, the smaller is the speed.

Figure 5:
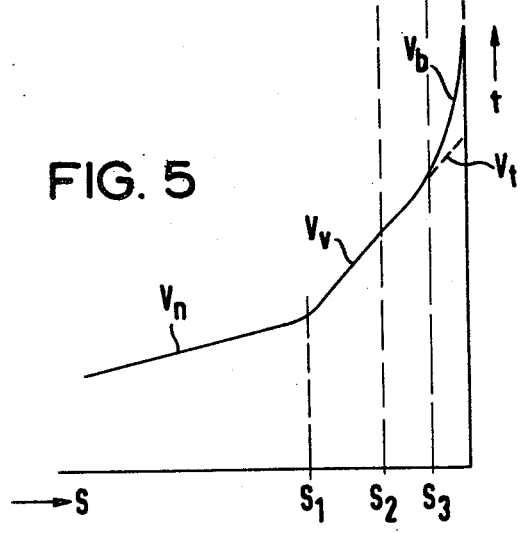

FIG. 5 shows a cycle of movement which is typical for known blowing machines. The two mould parts are moved in the closing direction initially at a relatively high, normally constant speed Vn until they have reached approximately the position $S_1$. Until about this point in time the only thing that matters is that the two mould parts should be moved in the closing direction as rapidly as possible in order to keep the amount of time required as small as possible. At the latest at the point $S_2$, at which the partly-finished product 15 is squeezed flat in the regions of the pinch edges, as shown in the illustration of FIG. 4, the reduction of the closing speed to the lower value Vv has been completed. The reduction to the speed Vv can for example be effected by bringing into action a throttle which is built into the hydraulic drive circuit for the two mould parts. After reaching the retarded closure speed Vv the two regions 15a, 15b (FIG. 4) of the intermediate product 15 are pressed against one another and with the formation of the above-mentioned welded seam are connected to one another until as a result the components take up the positions shown in FIG. 3, at which point the material located within the hollow mould has already been expanded. Without the presence of the intermediate product 15 between the pinch edges 18a, 18b the closure movement in the final phase would occur at the speed Vt shown in broken lines in FIG. 5 of the drawings. However, because of the effect of the preform shell, which shows itself particularly in the pinching operation to be performed, the closure movement in actual fact in the final phase occurs at a much slower rate Vb which decreases until finally it reaches zero. This decrease in the speed can be ascribed to the fact that with increasing duration of the closure process and of the pinching operation the thermoplastic material which is immediately in front of the pinch edges 18a, 18b becomes ever more strongly cooled, therefore becomes harder, and in consequence opposes the displacement force with an increasing resistance. Thus, in the known methods, the thickness of the film 56 (FIG. 3) still remaining between the mould parts and which connects the waste piece 55 with the base 54 of the hollow article 57 is for the most part comparatively large. The actual thickness of the film 56 always depends particularly upon the properties of the material being processed and the closure force with which the mould parts are pressed against one another.

Figure 6:
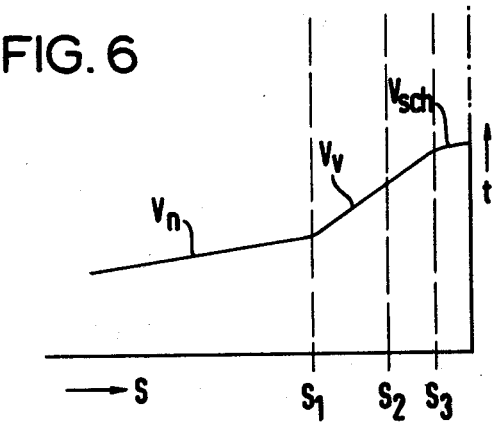

In contrast to the state of the art described above in connection with FIG. 5 of the drawings, according to the method of the present invention in the final phase of the closure process the closure movement is accelerated until finally at the end of the closure movement the hollow mould is closed. This final phase at the increased speed Vsch serves to complete the pinching off of the waste piece 55. In other words, it ensures that the thickness of the film 56 is reduced as far as possible, possibly to zero. The final closed position of the two mould halves 10a and 10b may be such that there remains a spacing between the two pinch edges 18a and 18b with the result that then the waste piece 55 remains connected to the hollow article 57 only by means of a very thin film 56. In any case, the removal of the waste piece can be accomplished with greater ease than is the case without using the features of the present invention. FIG. 6 of the drawings shows a displacement-time diagram of a closure process carried out in accordance with the teachings of the present invention in which, for open loop control of the speed, the closure path or cycle is divided by several points into sections and at each such point a control command is given for a change in the energy flow which for its part affects the drive of the mould parts. Thus, as shown in FIG. 6, the closure path followed by each mould part 10a, 10b is divided into three sections. In the first section the mould parts move with a rapid closure speed Vn which is higher than the speed which would be permissible for the making of the weld seam between the two wall parts 15a and 15b. By the generation of a control command at point $S_1$ the energy flow, which controls the closure movement, is changed in the usual way so that a reduction in the speed takes place with the result that in the following section up to point $S_3$ the resulting speed Vv is in a value range which is optimum for the production of the welded seam. The movement of the two pinch edges 18a, 18b at the speed Vv continues up to the point $S_3$ at which the pinch process has progressed to such an extent that the formation of the welded seam is substantially complete. At this point $S_3$ a control command is again generated which changes the energy flow in such manner that an increase in the speed of the mould parts 10a, 10b occurs and consequently the pinch edges 18a, 18b complete their movement at this increased speed Vsch. The choice of the speed Vsch and the acceleration necessary to achieve it are dependent upon the particular circumstances, particularly upon the necessary kinetic energy needed to achieve the effect which is being aimed for. In the final analysis with point control as described above, in the majority of cases the speed Vsch corresponds to the speed Vn since this is the simplest solution on grounds of ease of technical control. Independent of the magnitude of the selected speed Vsch there is in all circumstances a certainty that, with reference to any particular predetermined speed, the energy of movement grows with the size or with the mass of the hollow mould and/or of the associated parts. Thus, no special measures are necessary to take account of the particular masses to be moved, especially as each hollow mould is provided with a drive system appropriate to its size.

The control commands at the points $S_1$ and $S_3$ can be generated in dependence upon time and/or upon displacement. Since the different speeds are tied up with particular lengths of path it is preferable to produce the control commands in dependence upon displacement. In many cases however in which the closure movement is not carried out constantly over all path sections one can contemplate a time-dependent generation of the control commands. Thus, it may be preferable, because of some other function of the machine or of the overall process completely to interrupt the closure movement for a time at one point, for example point $S_1$, and then after a given time to continue the movement up to the point $S_3$ at the optimum speed for the welding operation. One such other function might be for example the need for the preform shell 15 to be partially expanded by the pressurised medium before the complete closure of the hollow mould. The control command at the point $S_3$ can also be made time-dependent, particularly if the spatial separation of the points $S_1$ and $S_3$ is very small and a displacement-dependent control could only be accomplished with a very great technical expense, or if a break in the movement is desirable here at point $S_3$.

Figure 7:
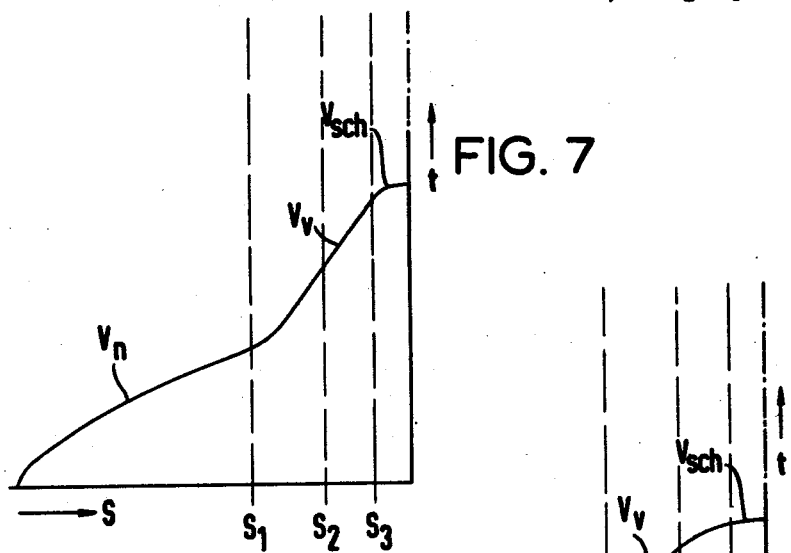

A displacement-time diagram for the particular apparatus shown in FIG. 1 is illustrated in FIG. 7. FIG. 7 shows that the changeover which takes place at the point $S_1$ to the slower closure speed Vv in accordance with the programmed control, for example the cam 35, occurs not abruptly but progressively, in accordance with the cam contour, in such manner that the closure speed gradually decreases until the velocity Vv has been reached, this speed Vv then being maintained. Moreover, the increase in the speed beyond the point $S_3$ is effected progressively until the maximum speed Vsch is reached.

A further possibility for programmed open loop control lies in the use of a so-called time-control unit (pilot choke adjuster or variable speed controller) which upon receiving a control command alters the energy flow to the mould drive means according to a function characteristic of the unit until the energy flow reaches a terminal value. Such open loop control would be carried out in the following manner according to the illustration shown in FIG. 8.

At the point $S_1$ the control command, through the time-control unit, causes the switching off of the energy flow to the mould drive means which up to the point $S_1$ causes the high closure speed Vn. At the point $S_1$ the speed falls initially to zero or approximately to zero. Immediately after the interruption or throttling of the energy flow the time-control unit, possibly by means of a further control command, and in accordance with a characteristic which is peculiar to it and may be adjustable, again permits an energy flow so that the speed rises after the point $S_1$. The positioning of the point $S_1$ and the choice of the characteristic for the time-control unit are so chosen that the speed increase up to the attainment of the point $S_3$ does not exceed the speed Vv which is critical for the welding operation. The speed which is effective between the points $S_1$ and $S_3$ increases continuously so that here one can talk of a speed range Vv whose upper limit however lies below the speed which is unfavourable for the formation of a good weld seam. The speed range Vv is in consequence first exceeded only at the point $S_3$ or thereafter without it being in any way necessary to give a new control command, since the increase in the speed beyond the point $S_3$ is from the first directly dependent upon the characteristic of the time-control unit.

Figure 2:
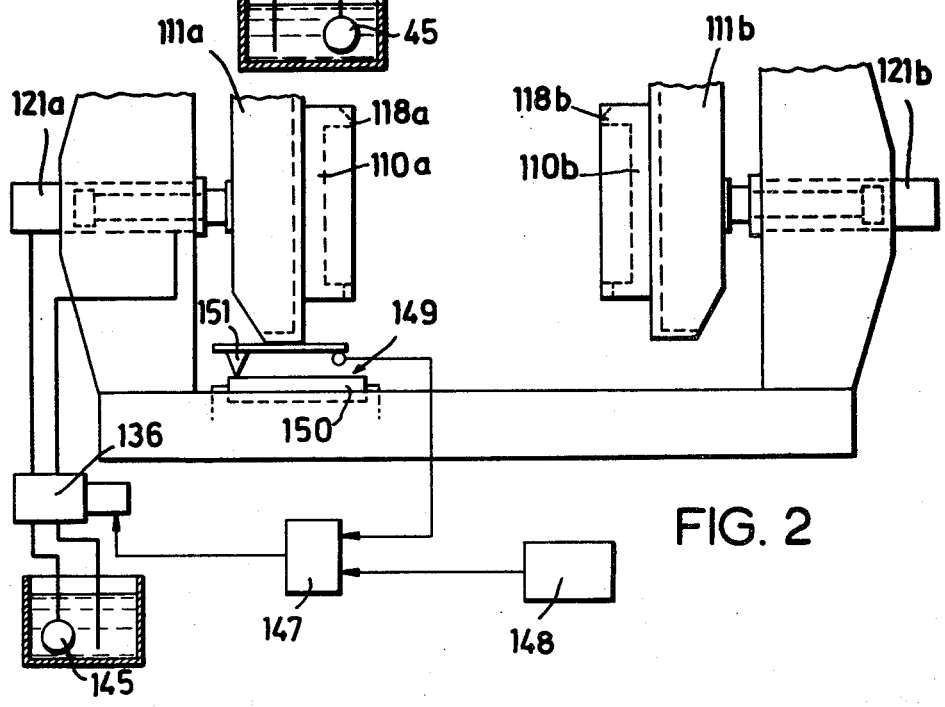
FIG. 2 is a view corresponding to FIG. 1 of an apparatus with an automatic control device (regulator) for the closure movement of the mould parts.

The embodiment shown in FIG. 2 shows schematically a programmed and regulated drive, i.e., automatic or closed loop control, for the closure movement which is programmed at least in relation to the part of the closure movement essential to the present invention. The apparatus shown in FIG. 2 corresponds in respect of its basic structure to the apparatus shown in FIG. 1, so that components in FIG. 2 which correspond to components in FIG. 1 are shown by the same reference numerals but increased by 100. The arrangement is so set up that the energy flow (oil flow) for the mould drive means (cylinders 121a, 121b) from the energy source (oil pump 145) is regulated by a control member which in a hydraulic drive may be a servo-valve 136. This control member maintains the particular control setting under the goverance of a regulator 147. The regulator 147 compares an actual value with a desired value. The latter is provided by a programmer 148 into which the speed programme has been fed. The actual value, which is given by the actual state of the apparatus, is determined by a position-detecting instrument. This is associated with the support member 111a and consists of a potentiometer 149 having a winding 150 along which a sliding contact 151 is displaceable, the latter being carried by the support member 111a. The potentiometer 149 is connected to the regulator 147 by suitable means, as is the programmer 148. Clearly, instead of the potentiometer 149 one can use some other real-value indicator, for example a photoelectric device, angular encoder or the like.

The actual spatial positions of the hollow mould parts 110a, 110b and in consequence of the pinch edges 118a, 118b are fed to the regulator 147 by means of the real-value indicator 149, and there they are compared with the desired values supplied by the programmer 148. Any difference between the real value and desired value is fed to the control element 136 as an error signal, and the control element 136 for its part regulates the energy flow to the two drive cylinders 121a, 121b in such manner that the predetermined speed programme is carried out. It is also true to say that just as with the embodiment shown in FIG. 1 it is in general sufficient for only one of the two mould parts 110a and 110b to have such a regulating device associated therewith, since it is possible to regulate both cylinders 121a and 121b by means of the one servo-valve 136, automatic synchronisation being effected for example by means of the chain 40 referred to above in connection with FIG. 1. It is however also possible to provide a separate regulating device for each of the two mould parts 110a and 110b and then the automatic synchronisation through the chain 40 can be omitted. In each case with the arrangement shown in FIG. 2, any speed programme can be achieved which can be set by the programmer. This may be for example any of the speed programmes illustrated in FIGS. 6 to 8 or some other speed programme.

Figure 8:
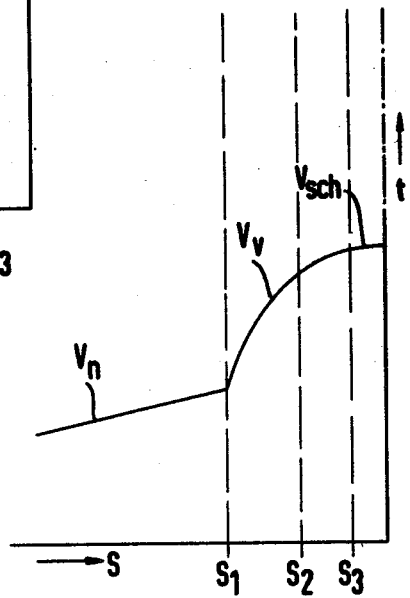

The point $S_2$ which is shown in the diagrams of FIGS. 7 and 8 corresponds to the point $S_2$ of FIG. 5 which defines the position of the pinch edges in the position shown in FIG. 4. In other words, this means that in each case sufficient retardation of the closure speed for the purpose of making a proper weld seam should be completed before the point $S_2$. The spacing of the point $S_1$ in advance of the point $S_2$ is dependent upon the particular circumstances, primarily upon the path which is necessary in order to effect the speed reduction from Vn to Vv.

Although the invention has been described above only in relation to the making of a base seam on a container standing on its head in the hollow mould, this should in no way be regarded as a limitation of the invention. On the contrary, the present invention is utilisable for all separating processes, in whatever way they may be carried out, in which additionally a connection through a welding process has to be made.

For the sake of completeness it is pointed out that in the final phase of the pinching process and consequently of the closure movement there is again a reduction of the rate of closure until the speed is finally brought to zero. This reduction is not programmed but rather is brought about by the apparatus since towards the end the mould parts strike against one another and in consequence the closure movement is automatically terminated.

I claim:

1. A method of producing hollow plastic articles by the blowing process, comprising the steps of:
    (a) introducing a deformable parison into an open multi-section blow mold whose cavity is dimensioned in such a way that upon closing of the mold surplus material of the parison is located outside of the cavity;
    (b) advancing mold halves toward one another into engagement with said parison and then continuously along a closure path to encompass and engage said parison thereby defining a squeezing process which begins when said mold halves make contact with said parison and ends with reduction of closure speed of said mold halves to zero with final closure of said mold halves;
    (c) advancing said mold halves during a first phase of said squeezing process at a speed sufficient to promote the welding of adjacent regions in at least one end of said parison;
    (d) admitting a compressed gas to said parison;
    (e) accelerating the advance of said mold halves during a subsequent phase of said squeezing process to a greater speed sufficient to produce and at least partially sever waste portions from said parison; and
    (f) discharging the plastic article.

2. A method as defined in claim 1, wherein the step of accelerating the advance of said mold halves to a greater speed is performed in the second half of that part of the closure path which corresponds to said squeezing process.

3. A method as defined in claim 1, wherein said greater speed is substantially equal to the initial speed at which said mold halves were advanced in step b) prior to the beginning of said squeezing process.

4. A method as defined in claim 1, wherein the magnitude of said greater speed at the time of termination of said squeezing process is substantially equal to the initial speed at which said mold halves were advanced in step b) prior to the beginning of said squeezing process.

* * * * *